US008706366B2

(12) United States Patent
Kim et al.

(10) Patent No.: US 8,706,366 B2
(45) Date of Patent: Apr. 22, 2014

(54) APPARATUS AND METHOD FOR CONTROLLING ENGINE OF VEHICLE USING HEIGHT INFORMATION

(75) Inventors: Jae-Chul Kim, Daejeon (KR); Seong-Ho Lee, Daejeon (KR); Yoon-Seop Chang, Daejeon (KR); Jae-Jun Yoo, Daejeon (KR); Sun-Rae Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 704 days.

(21) Appl. No.: 12/962,071

(22) Filed: Dec. 7, 2010

(65) Prior Publication Data

US 2011/0153152 A1 Jun. 23, 2011

(30) Foreign Application Priority Data

Dec. 17, 2009 (KR) .................. 10-2009-0126028

(51) Int. Cl.
*F02D 41/08* (2006.01)
*G06F 19/00* (2011.01)

(52) U.S. Cl.
USPC ............... 701/54; 701/101; 701/112; 701/38; 303/192; 477/203; 477/8; 290/40 R; 123/179.4

(58) Field of Classification Search
CPC ........ B60W 10/00; B60W 10/02; F16H 61/20
USPC ............ 701/54, 101, 112, 38; 303/192; 180/65.1, 65.21; 477/203, 186, 7; 290/40 R; 123/179.4, 179.3
See application file for complete search history.

(56) References Cited

U.S. PATENT DOCUMENTS

| 5,863,277 A * | 1/1999 | Melbourne ................ 477/203 |
| 6,411,881 B1 * | 6/2002 | Thomas ..................... 701/67 |
| 7,032,697 B2 * | 4/2006 | Lee .......................... 180/65.25 |
| 7,593,798 B2 * | 9/2009 | Han et al. ................. 701/50 |
| 8,060,269 B2 * | 11/2011 | Dix ........................... 701/23 |
| 8,090,499 B2 * | 1/2012 | Tamai ....................... 701/38 |
| 8,210,978 B2 * | 7/2012 | Shirasaka et al. ........ 475/129 |
| 8,251,870 B2 * | 8/2012 | Nihei et al. ............... 477/107 |

(Continued)

FOREIGN PATENT DOCUMENTS

| JP | 2001-169408 | 6/2001 |
| KR | 1019990053571 | 7/1999 |
| KR | 1020050011920 | 1/2005 |
| KR | 10-0774649 | 5/2007 |

OTHER PUBLICATIONS

Huang et al., 3D road geometry based optimal truck fuel economy, Nov. 11-15, 2007, MechE Congress and Exposition.*

*Primary Examiner* — Thomas Black
*Assistant Examiner* — Sara Nelson
(74) *Attorney, Agent, or Firm* — H.C. Park & Associates, PLC (57) ABSTRACT

Disclosed is an apparatus for controlling engine using height information capable of preventing an engine from stopping according to a position of a vehicle. An apparatus for controlling an engine of a vehicle using height information includes: a height information management unit storing a plurality of height information; and an idling controller that extracts one or more height information according to a position of the vehicle from the height information management unit to determine a slope of the vehicle and controls the idling of the vehicle according to the determination result.

12 Claims, 5 Drawing Sheets

(56) References Cited

U.S. PATENT DOCUMENTS

| | | | |
|---|---|---|---|
| 8,386,138 B2* | 2/2013 | Nihei et al. | 701/54 |
| 8,402,936 B2* | 3/2013 | Nakamura | 123/179.4 |
| 2002/0161507 A1* | 10/2002 | Fuse | 701/112 |
| 2004/0046394 A1* | 3/2004 | Lim | 290/40 C |
| 2005/0140208 A1* | 6/2005 | Ji | 303/192 |
| 2007/0099755 A1 | 5/2007 | Shim | |
| 2007/0293994 A1* | 12/2007 | Zerbini et al. | 701/22 |
| 2010/0168992 A1* | 7/2010 | Nakata | 701/112 |
| 2010/0332062 A1* | 12/2010 | Goto et al. | 701/22 |
| 2011/0172869 A1* | 7/2011 | Bell et al. | 701/22 |

* cited by examiner

APPARATUS AND METHOD FOR CONTROLLING ENGINE OF VEHICLE USING HEIGHT INFORMATION

CROSS REFERENCE TO RELATED APPLICATIONS

This application claims priority to Korean Patent Application No. 10-2009-0126028 filed on Dec. 17, 2009, the entire content of which is herein incorporated by reference.

BACKGROUND OF THE INVENTION

1. Field of the Invention

The present invention relates to an apparatus and a method for controlling an engine of a vehicle, and more particularly, to an apparatus and a method for controlling an engine of a vehicle capable of determining an inclined place or not using height information and controlling the engine driving of a vehicle.

2. Description of the Related Art

In order to save energy and reduce discharge of carbon dioxide, an idle stop & go (ISG) apparatus automatically controlling the start is mounted in a vehicle at the time of vehicle idling.

The ISG apparatus automatically idle-stops the engine that starts under predetermined conditions such as the case when the idle state of the engine is maintained at a predetermined time or more due to the stop of a vehicle, etc. Thereafter, when restart is required by a driver's command and the vehicle conditions, the ISG apparatus is an engine management system which functions by automatically turning-on the engine starting in order to normally operate the vehicle.

The condition to enter an engine into the idling by the ISG apparatus is a stop state that cannot detect a speed of a vehicle. That is, the condition of the transmission is maintained in a neutralized state and a brake pedal is pressed for a predetermined time is detected, the engine stops in order to increase fuel-efficiency and safety of emission.

When the starting requirements of the driver, such as the operation of the accelerator pedal, the release of the brake pedal, the operation of the clutch pedal, etc., are detected, the engine starting is turned-on to follow through normal driving in the state where the engine is idling by the ISG apparatus.

However, when the driver parks the vehicle mounted with the existing ISG apparatus at a sloped road, a phenomenon occurs when the vehicle does not stop but moves back due to the geographical characteristics at the time the engine stops, which prevents the idling of the engine. This cause leads to a vehicle accident. Therefore, a separate apparatus that determines the geographical characteristics of the place where the vehicle is parked to prevent the engine from stopping is needed.

SUMMARY OF THE INVENTION

It is an object of the present invention to provide an apparatus for controlling an engine of a vehicle capable of preventing an engine from stopping according to a position of a vehicle without attaching a separate device to a vehicle.

It is another object of the present invention to provide a method for controlling an engine of a vehicle using an apparatus for controlling an engine of a vehicle.

In order to achieve the above objects, according to an exemplary embodiment of the present invention, there is provided an apparatus for controlling an engine of a vehicle using height information, including: a height information management unit storing a plurality of height information; and an idling controller that extracts one or more height information according to a position of the vehicle from the height information management unit to determine an slope of the vehicle and controls the idling of the vehicle according to the determination result.

The idling controller compares slope information of the vehicle included in one or more height information with a reference value and outputs a control signal that maintains or stops the idling of the vehicle according to the comparison result.

The apparatus for controlling an engine of a vehicle using height information further includes a traveling information management unit storing the traveling information of the vehicle, and wherein the idling controller extracts the traveling information according to the position of the vehicle from the traveling information management unit.

The idling controller extracts one or more height information corresponding to the traveling information extracted from the plurality of height information.

The apparatus for controlling an engine of a vehicle using height information further includes a vehicle information detector that outputs vehicle state information to the idling controller through a plurality of sensors, and wherein the idling controller senses the idling state of the vehicle based on the vehicle state information transmitted from the vehicle information detector.

According to another exemplary embodiment of the present invention, there is provided a method for controlling an engine of a vehicle including: extracting height information according to a position of a vehicle among a plurality of height information; comparing slope information included in extracted height information with a reference value; and outputting a control signal that maintains or stops the idling of the vehicle according to the comparison result.

The outputting the control signal maintains the idling of the vehicle when the slope information is larger or smaller than the reference value.

The outputting the control signal outputs the control signal that stops the idling of the vehicle if the slope information is equal to the reference value.

The method for controlling an engine of a vehicle further includes: sensing the idling state of the vehicle from the vehicle state information; and extracting the traveling information of the vehicle when the vehicle is parked and the predetermined time elapses according to the sensing result.

The traveling information includes at least one of the information on the current position of the vehicle, the information on the moving direction, and the information on the current traffic condition.

The extracting the height information according to the position of the vehicle extracts one or more height information according to the traveling information extracted from the plurality of height information. The height information may be altitude information.

The apparatus and method for controlling an engine of a vehicle according to the present invention can secure safety without separate additional cost by adding only the height information management unit and the height information data (HI) capable of managing the geographical information according to the position of a vehicle to the existing ISG system.

In addition, the present invention obtains the vehicle slope information at the point where the vehicle stops by adding only the height information management unit and the height information data, thereby making it possible to prevent the engine of the vehicle from stopping due to the ISG system at the inclined area.

In addition, the present invention does not incur costs to configure additional hardware since a separate sensor and connection apparatus to obtain the vehicle slope information are not needed.

DETAILED DESCRIPTION OF THE PREFERRED EMBODIMENTS

In order to fully understand benefits in the operation of the present invention and objects to be achieved by exemplary embodiments of the present invention, the accompanying drawings illustrating the exemplary embodiments of the present invention and the contents described in the accompanying drawings should be referred.

Hereinafter, the exemplary embodiment of the present invention will be described in detail with reference to the accompanying drawings to help understand the present invention. Like reference numerals proposed in each drawing denote like components.

Figure 1:
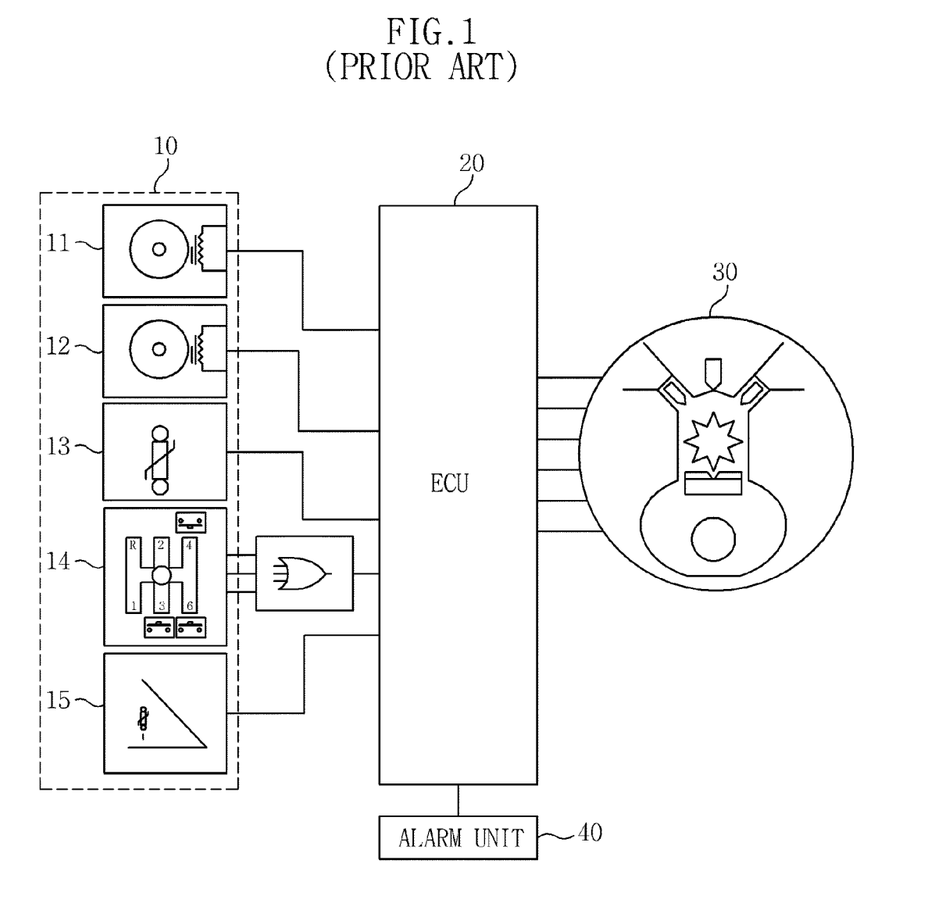
FIG. 1 is a schematic block diagram of an apparatus for preventing engine-stop of a vehicle according to the prior art.
Figure 2:
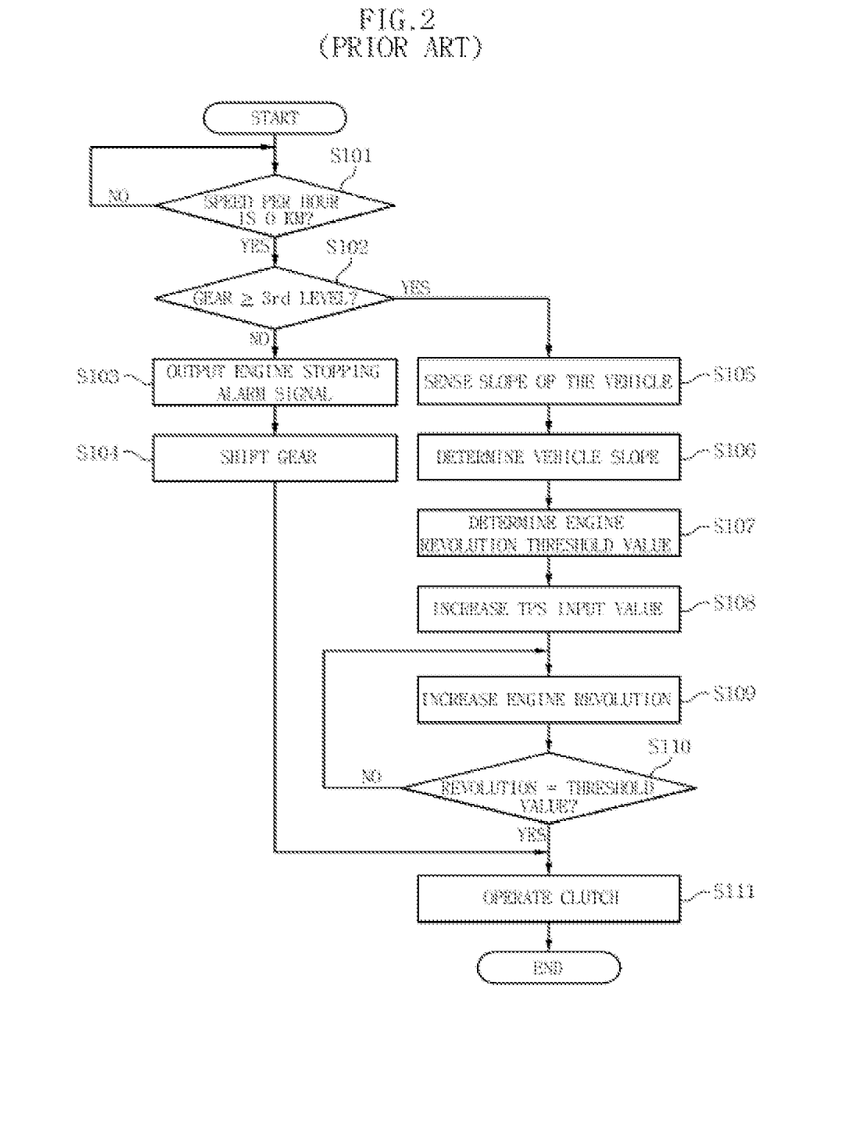
FIG. 2 is a control flow chart of an apparatus for preventing engine-stop of a vehicle shown in FIG. 1.

FIG. 1 is a schematic block diagram of an apparatus for preventing engine-stop of a vehicle according to the prior art and FIG. 2 is a control flow chart of an apparatus for preventing engine-stop of a vehicle according to the related art.

Referring to FIG. 1, a sensor unit 10 may include a vehicle speed sensor 11, an RPM sensor 12, a slope sensor 13, a transmission sensor 14, and a throttle valve sensor 15.

Various sensors in the sensor unit 10 detects the current state of the vehicle and transmits sensed data to a vehicle control unit, for example, an ECU 20, wherein the ECU 20 may control an engine unit 30 of a vehicle according to the sensing data output from the sensor unit 10.

For example, the vehicle speed sensor 11 of the sensor unit 10 may output data sensing the current speed of the vehicle to the ECU 20, the RPM sensor 12 may transmit data sensing the revolution of the vehicle engine to the ECU 20, and the slope sensor 13 may transmit data sensing the slope of the vehicle to the ECU 20 when the vehicle is parked at a inclined surface. The slope of the vehicle may be a tilt angle of the vehicle.

Further, the transmission sensor 14 of the sensor unit 10 may transmit the data sensing the gear position of the transmission according to the current speed of the vehicle to the ECU 20 and the throttle sensor 15 may transmit data sensing the opened degree of the throttle valve opened when a driver presses the accelerator pedal to the ECU 20.

The ECU 20 uses the plurality of sensing data transmitted from the sensor unit 10 to generate the control signals necessary for the vehicle control and the generated control signal may be provided to the engine unit 30.

The engine unit 30 may control the power of the vehicle according to the control signal transmitted from the ECU 20.

When the position of the transmission of the vehicle is wrong according to the sensing data input from the transmission sensor 14 of the sensor unit 10, the alarm unit 40 informs the driver of this situation such that the driver can control the transmission meeting the speed of the vehicle.

Referring to FIGS. 1 and 2, when the driver stops the vehicle while the vehicle is travelling, he/she may compare and determine whether the speed of the current vehicle is 0 km/h by using the vehicle speed sensor 11 of the sensor unit 10 (S101).

As a result of the comparison and determination, when the speed of the vehicle is 0 km/h, the transmission sensor 14 of the sensor unit 10 can sense whether the gear level of the vehicle is 3rd levels or more (S102).

As a result of the sensing result, when the gear number of the vehicle is 3rd levels or more or below 3rd levels, the alarm unit 40 can inform the driver that the engine of the vehicle may stop (S103).

The driver can shift the vehicle gear to the proper level, for example, neutral according to the notification of the alarm unit 40 (S104). Then, the driver may start the vehicle by operating the clutch without stopping the engine (S111).

Meanwhile, as the sensing result, when the gear level is below 3rd levels, the slope sensor 13 may sense the slope at the current position of the vehicle (S105).

The sensing result of the slope sensor 13 is transmitted and determined by the ECU 20 (S106) and the ECU 20 may determine the revolution threshold of the engine according to the sensed slope of the vehicle (S107).

Then, the ECU 20 may increase the input value of the throttle value sensor 15 (S108) and may increase the revolution of the engine to the threshold value (S109).

In addition, the ECU 20 compares the increased revolution of the engine with the threshold value (S110). As the comparison result, the driver shifts the gear and operates the clutch, thereby making it possible to start the vehicle without stopping the engine (S111).

However, since the above technology is applied to the passive gear vehicle according to the related art, it is difficult to apply to the structure that the gear is automatically shifted according to the vehicle speed such as the automatic transmission.

Hereinafter, the apparatus for controlling the engine is capable of preventing the engine from stopping in the automatic transmission vehicle according to an exemplary embodiment of the present invention.

Figure 3:
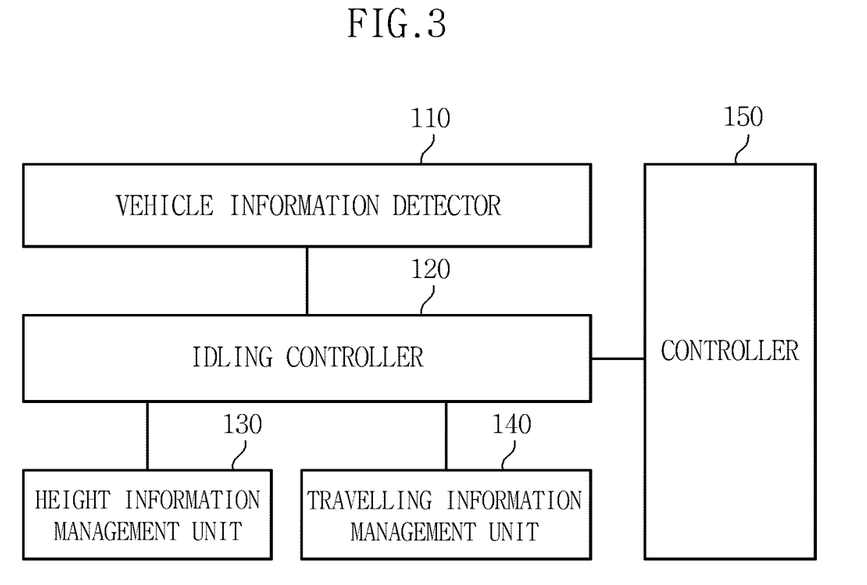
FIG. 3 is a schematic block diagram of a configuration of an apparatus for controlling the engine according to an exemplary embodiment of the present invention.
Figure 4:
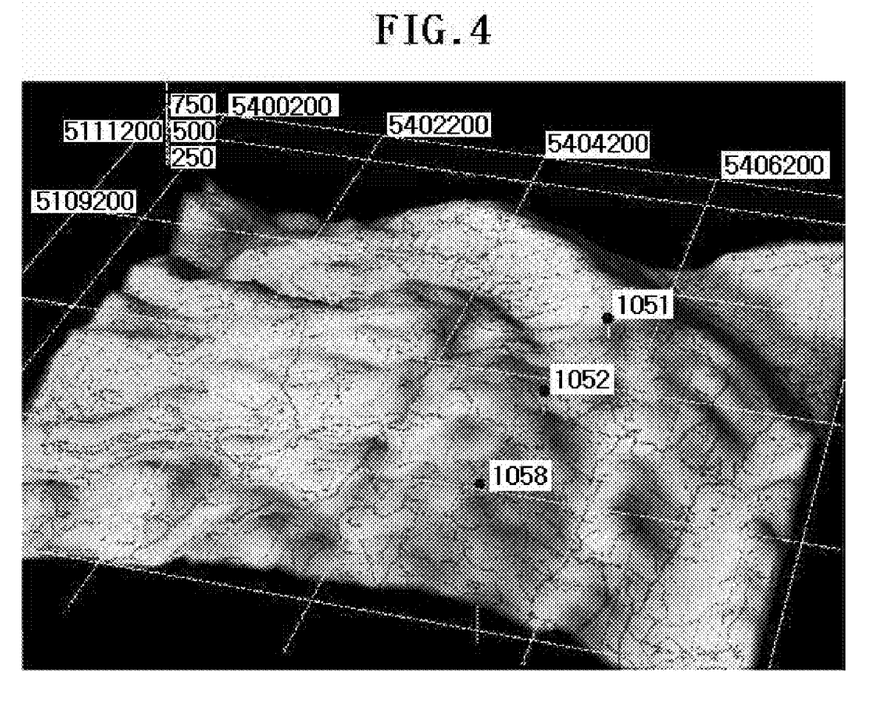
FIG. 4 is an exemplified diagram showing an example of height information.

FIG. 3 is a schematic block diagram of the apparatus for controlling the engine according to an exemplary embodiment of the present invention and FIG. 4 is a diagram showing an example of height information stored in the height information management unit of FIG. 3.

Referring to FIG. 3, the apparatus for controlling the engine 100 may include a vehicle information detector 110, an idling controller 120, a height information management unit 130, a traveling information management unit 140, and a controller 150.

The vehicle information detector 110 may detect and output the information on the state of the traveling vehicle through the plurality of sensors in the vehicle.

For example, the vehicle information detector 110 may detect the state information on the traveling vehicle from the plurality of sensors in the vehicle such as the vehicle speed sensor, the RPM sensor, the slope sensor, the transmission sensor, the throttle valve sensor, etc.

The state information of the vehicle detected from the vehicle information detector 110 may be output to the idling controller 120.

The idling controller 120 may output control signals that can maintain or stop the idling of the engine according to the state information of the vehicle and the information output each of the height information management unit 130 and the traveling information management unit 140 to be described below.

For example, the idling controller 120 may obtain the slope information on the current position of the vehicle or the moving direction of the vehicle from the height information (HI) of the vehicle from the traveling information of the vehicle output from the traveling information management unit 140 and the height information management unit 130 corresponding to the traveling information.

Further, the idling controller 120 compares the obtained slope information with the reference value, for example, the reference slope information and outputs the control signals that may maintain or stop the idling of the engine according to the comparison result.

Although the starting (or idling) of the vehicle stop, the reference value may mean the slope information sufficient enough not to move the vehicle, for example, the slope information of 0°.

Further, the reference value may be set according to the driver's intention.

The height information management unit 130 may store a variety of height information (HI) and extracts the current position of the vehicle according to the information request of the idling controller 120 or more than one height information (HI) according to the moving direction of the vehicle to output them to the idling controller 120.

The height information (HI) divides the area (or space) in which the vehicle is moving into a predetermined interval and records contour values of each divided points, that height values from a ground surface as a digital value and may be geographical height data obtained by shaping it through three-dimensional modeling.

The height information (HI) may include a digital elevation model and the driver of the vehicle may optionally input the height information (HI).

The height information (HI) may have the shape as shown in FIG. 4.

A variety of height information (HI) may be stored in the height information management unit 130 and stored in the height information management unit 130 by being received from the outside according to the travelling position of the vehicle.

The travelling information management unit 140 may store the travelling information such as the position, the moving direction, the traffic situation, etc., of the vehicle.

The travelling information management unit 140 may extract the travelling information according to the current position of the vehicle according to the information request of the idling controller 120 to output it to the idling controller 120.

The travelling information management unit 140 may be implemented by telematics devices in the vehicle such as the satellite navigational device (hereinafter, GPS) or the navigational device, and the like.

In addition, the travelling information management unit 140 according to the various embodiments of the present invention accesses a vehicle control server (not shown), for example, by using communication devices in a vehicle and may obtain and store the travelling information such as the current position, the moving direction, or traffic information, etc., of the vehicle from the vehicle control server.

The controller 150 controls the operation of the power devices of the vehicle according to the control signal output from the idling controller 120 to maintain the idling of the engine or stop the starting of the vehicle.

Figure 5:
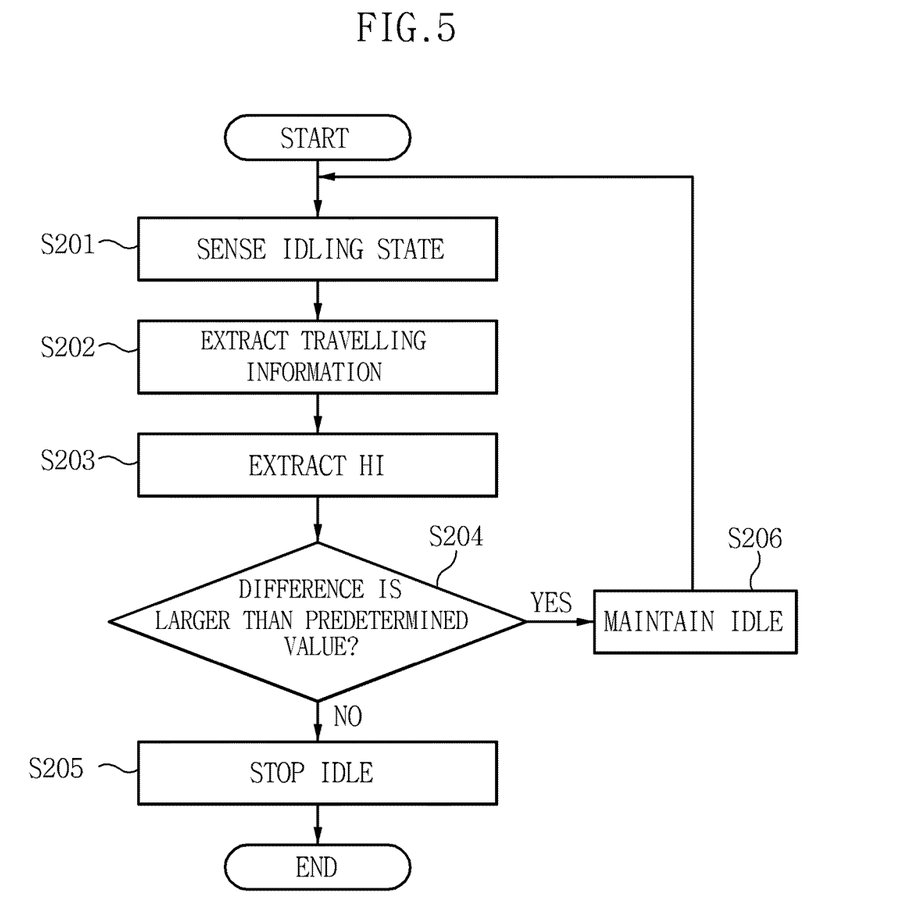
FIG. 5 is a control flow chart of an engine management method according to an exemplary embodiment of the present invention.

FIG. 5 is a flow chart of the engine control method controlling the stopping of the engine by using the apparatus for controlling the engine shown in FIG. 3.

Referring to FIGS. 3 and 5, when the driver stops the vehicle at the predetermined position, the idling controller 120 of the apparatus for controlling the engine 100 can sense the idling state of the vehicle (S201).

The idling controller 120 may sense the idling state of the vehicle according to the plurality of sensing data output from the vehicle information detector 110, for example, the current vehicle speed and the engine revolution output from the vehicle speed sensor or the RPM sensor.

As the sensing result, if it is determined that a predetermined time elapses in the state where the vehicle stops, the idling controller 120 requests the travelling information to the travelling information management unit 140 and the travelling information management unit 140 may extract and output the information on the corresponding travelling information according to the request of the idling controller 120, that is, the information on the current position of the vehicle, the information on the moving direction, and the information on the current traffic condition (S202).

In addition, the idling controller 120 may obtain the information on the current position of the vehicle and the moving direction of the vehicle among the travelling information of the vehicle output from the travelling information management unit 140 and may request the height information (HI) corresponding to the obtained information to the height information management unit 130.

The height information management unit 130 may extract the corresponding height information among the plurality of stored height information (HI) according to the request of the idling controller 120 and output it to the idling controller 120 (S203).

In this case, the height information (HI) output from the height information management unit 130 may be used for generating the slope information on the road based on the current position of the vehicle or the slope information in the moving direction of the vehicle, that is, the ground surface.

The idling controller 120 may compare the slope information generated from the output height information (HI) with the reference value (S204).

As described above, although the starting (or idling) of the vehicle stop, the reference value may mean the slope information sufficient enough not to move the vehicle, for example, the slope information of 0°.

The idling controller 120 compares the slope information of the vehicle generated from the height information (HI) with the reference value (S204) and may output the control signal that maintains or stops the idling of the engine according to the comparison result.

For example, the idling controller 120 may output the control signal that maintains the idling of the engine if the difference between the slope information and the reference value is larger than a predetermined value. The predetermined value may be set by a car maker or a driver.

The controller 150 controls the operation of the power devices of the vehicle according to the control signal output from the idling controller 120, that is, the engine operation of the vehicle, and even though the idling time of the vehicle is long, maintains the long idling state (S206).

However, the idling controller 120 may output the control signal that stops the idling of the engine if the difference between the slope information and the reference value is smaller than a predetermined value. The predetermined value may be set by a car maker or a driver.

The controller 150 controls the engine operation of the vehicle according to the control signal output from the idling controller 120 to stop the starting of the vehicle, thereby making it possible to stop the idling of the engine (S205).

The present invention as described above are not limited to the configuration and method of the embodiments as described above, but the embodiments may be configured by selectively combining all the embodiments or some of the embodiments so that various modifications can be made. Accordingly, the actual technical protection scope of the present invention must be determined by the spirit of the appended claims.

What is claimed is:

1. An apparatus for controlling an engine of a vehicle using height information, comprising:
    a height information management unit configured to store height information;
    a travelling information management unit configured to store travelling information of the vehicle, the travelling information including a position of the vehicle;
    a vehicle information detector configured to transmit vehicle state information to the idling controller through sensors; and
    an idling controller configured to detect an idling state of the vehicle based on the vehicle state information transmitted from the vehicle information detector, and to extract travelling information of the vehicle from the travelling information unit when the vehicle is stopped and a time period elapses after stopping, and to extract one or more items of height information from the height information management unit according to the position of the vehicle included in the travelling information to determine a slope of the vehicle,
    wherein the idling controller is configured to control an idling of the vehicle according to the determined slope of the vehicle.

2. The apparatus according to claim 1, wherein the idling controller is configured to compare the determined slope of the vehicle with a reference value and to output a control signal that maintains or stops the idling of the vehicle according to the comparison result.

3. The apparatus according to claim 2, wherein the idling controller is configured to output the control signal to maintain the idling of the vehicle when the difference between the determined slope of the vehicle and the reference value is greater than a predetermined value.

4. The apparatus according to claim 2, wherein the idling controller is configured to output the control signal to stop the idling of the vehicle when the difference between the determined slope of the vehicle and the reference value is less than a predetermined value.

5. The apparatus according to claim 2, wherein the reference value is set such that the vehicle does not move when the idling of the vehicle is stopped.

6. The apparatus according to claim 1, wherein the height information comprises a digital elevation model.

7. The apparatus according to claim 1, wherein each item of the height information comprises geographical height data obtained by three-dimensional modeling of an area in which the vehicle is moving.

8. The apparatus according to claim 1, wherein the travelling information comprises at least one of a current position of the vehicle, a moving direction of the vehicle, and a current traffic condition of the vehicle.

9. A method for controlling an engine of a vehicle, the method comprising:
    sensing an idling state of the vehicle from a vehicle state information;
    extracting travelling information of the vehicle when the vehicle has stopped and a time period elapses after stopping, the travelling information including the position of the vehicle when the vehicle is stopped;
    extracting height information according to the position of the vehicle included in the travelling information from stored height information;
    generating slope information in a moving direction of the vehicle from the extracted height information of the vehicle and traveling information of the vehicle;
    comparing slope information of the vehicle with a reference value; and
    outputting a control signal that maintains or stops idling of the vehicle according to the comparison result.

10. The method according to claim 9, wherein the outputting the control signal outputs the control signal that maintains the idling of the vehicle when the difference between the slope information and the reference value is greater than a predetermined value.

11. The method according to claim 9, wherein the outputting the control signal outputs the control signal that stops the idling of the vehicle when the difference between the slope information and the reference value is less than a predetermined value.

12. The method according to claim 9, wherein:
    the travelling information comprises at least one of a current position of the vehicle, a moving direction of the vehicle, and a current traffic condition of the vehicle, and
    the extracting height information according to the position of the vehicle extracts height information according to the extracted travelling information from the stored height information.

* * * * *